W. B. GASSER.
BOLT AND NUT LOCK.
APPLICATION FILED MAR. 26, 1917.
1,269,532.
Patented June 11, 1918.
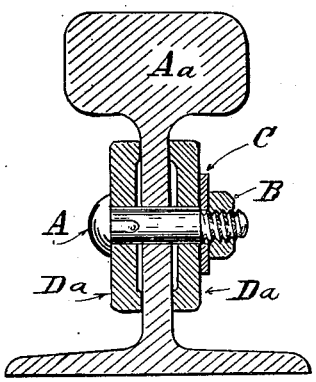
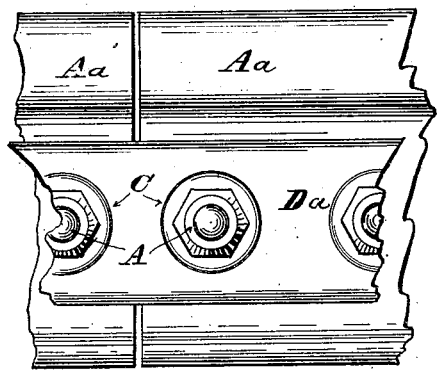
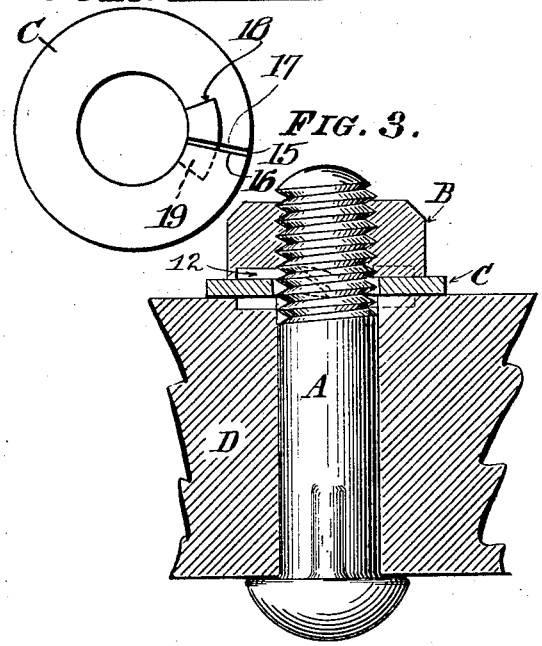
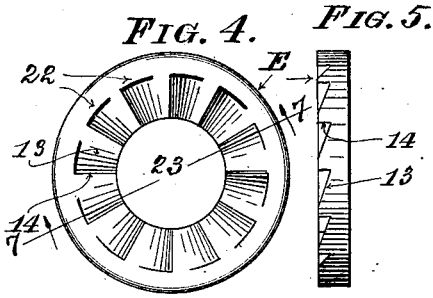
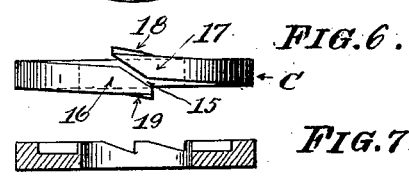
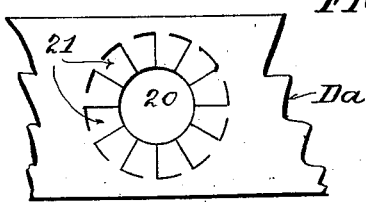
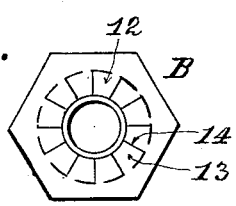
WITNESSES:
CH. Stark
A. S. Peterson
INVENTOR:
WILLIAM B. GASSER,
BY Michael J. Stark & Son
ATTORNEYS.

UNITED STATES PATENT OFFICE.

WILLIAM B. GASSER, OF CHICAGO, ILLINOIS, ASSIGNOR, BY DIRECT AND MESNE ASSIGNMENTS, OF ONE-FOURTH TO ALBERT SCHOCH, ONE-EIGHTH TO MINNIE ALEXANDER, AND ONE-EIGHTH TO REUBEN J. FELDMAN, OF CHICAGO, ILLINOIS.

BOLT AND NUT LOCK.

1,269,532.  Specification of Letters Patent.  Patented June 11, 1918.

Application filed March 26, 1917. Serial No. 157,465.

*To all whom it may concern:*

Be it known that I, WILLIAM B. GASSER, a citizen of the United States, and a resident of the city of Chicago, in the county of Cook and State of Illinois, have invented a certain new and useful Improvement in Bolt and Nut Locks; and I do hereby declare that the following description of my said invention, taken in connection with the accompanying sheet of drawing, forms a full, clear, and exact specification, which will enable others skilled in the art to which it appertains to make and use the same.

My invention relates generally to improvements in bolt and nut locks; and it consists, essentially, in the novel and peculiar combination of parts and details of construction, as hereinafter first fully set forth and described and then pointed out in the claim.

The object of this invention is the production of an efficient, serviceable, and comparatively cheap nut locking device.

To accomplish this object, I construct this nut locking device as shown in the drawings, in which Figure 1 is a sectional elevation of a railway rail showing the fish plates thereon secured to the rail by a track bolt provided with my improved nut locking device. Fig. 2 is a side elevation of the same. Fig. 3 is a sectional elevation of a bolt having the improved nut locking device applied to a wooden object. Fig. 4 is a plan of an auxiliary washer prepared to coöperate with my improved locking device. Fig. 5 is an edge view of the same. Fig. 6 is an edge view of the split washer; and Fig. 7 is a sectional view of the auxiliary washer drawn on line 7—7 of Fig. 4. Fig. 8 is a plan of the locking nut inverted; and Fig. 9 is a fragment of the fish plate or other object prepared for use in connection with my device. Fig. 10 is a plan of the primary, or split washer detached.

This device comprises four parts, viz. the bolt A, the nut B, the split washer C, and the object D, on which the bolt is to be applied.

A*a*, designates a railway rail; and D*a*, the fish plates thereon. The bolt A is of usual construction, being either a machine bolt, a carriage bolt, a track bolt, and the like. The nut B may be of any external contour, being either square or hexagonal, and in the lower face of this nut there are provided a series of, preferably radially extending, depressions 12, which depressions have, preferably, an inclined bottom 13, and a vertical wall 14. Underneath this nut, when applied to an object, there is placed a washer C, of peculiar construction, being a ring which is split diagonally, or on the bias, as shown at 15; and the adjacent ends 16, 17, of this ring, are upwardly and downwardly bent as illustrated in Fig. 6, so as to make the washer slightly helical and resilient, there being formed at these adjacent ends projecting, preferably tapering humps 18, 19, so that when the two adjacent ends 16, 17, are brought into alinement, these tapering humps 18, 19, are above the flanks or faces of the washer. The radial depressions in the nut terminate at some distance from the nut-axis, as shown in Fig. 8, and the tapering projection on the upper face of the split washer terminate at substantially the same distance from the center of the split washer. By this construction I secure the advantage of having a comparatively large bearing area of the nut upon the split washer. And in a like manner, the projection or hump 19 on the under side of the split washer C, terminates at substantially the same distance from the washer-axis as the projection or hump 18 on the upper side of said washer.

In the object D*a*, on which the bolt is to be used, there are formed, as shown in Fig. 9, around the bolt hole 20, a series of, preferably radially extending, depressions 21, having, preferably, inclined bottoms and vertical walls similar to the depressions 12 in the bottom face of the nut B. These depressions 21, as shown in Fig. 9, which represent among other objects, a fragment of a fish plate, may be cast directly into the plate, while in other cases they may be stamped into the object, as circumstances may dictate; but where the object D is wood, as illustrated in Fig. 3, these depressions are dispensed with because in this instance the lower projection 19 will bed itself into the wood, and thus hold the split washer in position.

The bolt, the washer, and the nut are applied to the object in the usual manner, and when the nut, in screwing onto the bolt, reaches the washer, the same will slip over the projection 18, until the nut is tightly screwed onto the bolt. The projection 18 on the washer will then occupy one of the depressions in the bottom face of the nut, while the projection 19 will occupy one of the notches or depressions 21 in the object Da, the application of the nut having brought the two opposing ends of the washer into one plane and alinement. In this manner the projection 18 bears against the vertical wall in the depression 12, and the projection 19 may bear against the vertical wall of the depression 21 in the object Da, thereby positively locking the nut against unscrewing, without interfering with its being still farther screwed up should shrinkage or wear cause the nut to become loose, but not caused by an unscrewing thereof, which, as already stated, will not be possible short of the destruction of the nut, or the cutting away of the projections 18, or 19.

In a case where the production of the depressions 21 in the object or article Da is impractical or impossible, I shall place under the washer C an auxiliary washer E, such as is illustrated in Figs. 4, 5, and 7, said auxiliary washer having in its one face the depressions 22 of the same contour as those in the object Da, the other face of the auxiliary washer being shaped to correspond to the contour of the surface on which it is to be used. The depressions 22 in this auxiliary washer may extend for some distance from the bolt hole 23 therein, as shown in Fig. 4, and they may extend to the margin thereof, as illustrated in Fig. 5.

It will now be observed that the cost of manufacture of this device need not exceed that of any other nut locking contrivance. The nut, being generally hot-punched, the production thereof does not cost any more than a plain nut. The split washer may cost a trifle more than a plain washer, owing to the projections thereon which can, however, be readily produced in punching, while the inclined cut or split therein is easily done with a milling cutter or saw, all of which operations can be performed at a trifling cost of labor.

When this nut lock is used on fish plates and other stamped, rolled, or drawn objects, the depressions in the face can be produced therein at the same time that the holes are punched therein, so that this part of my device adds nothing whatever to the cost of the article.

Having thus fully described this invention, I claim as new, and desire to secure to myself by Letters Patent of the United States—

In a device of the nature described, the combination, of a bolt, a nut on said bolt, said nut having in its lower face a series of radially extending depressions, one wall of said depressions being substantially at right angles to the bottom face of said nut, the other wall being inclined and vanishing in said bottom face, a washer under said nut, said washer being radially split, the split being inclined to the faces of said washer, there being at adjacent ends of said washer inclined projections, the upper one of said projections engaging one of said depressions in said nut to prevent unscrewing thereof, the radial depressions in the nut terminating substantially the same distance from the nut-axis as the projection on the upper face of the split washer, and an auxiliary washer under said split washer, said auxiliary washer being a solid ring having in one of its faces radially extending, V-shaped depressions engaging the lower projection on the split washer, the other face of said solid washer having a contour corresponding to the contour of the object on which the washer is to be placed, the projection on the upper face of the split washer extending from the hole in said washer to within a pronounced distance from the margin thereof, the lower projection on said split washer extending entirely across the face thereof, but in a direction opposed to the projection on the upper face.

In testimony that I claim the foregoing as my invention, I have hereunto set my hand.

WILLIAM B. GASSER.

Copies of this patent may be obtained for five cents each, by addressing the "Commissioner of Patents, Washington, D. C."